(12) United States Patent
Umeyama et al.

(10) Patent No.: US 9,929,406 B2
(45) Date of Patent: Mar. 27, 2018

(54) NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Naoyuki Wada, Hirakata (JP); Yusuke Fukumoto, Toyonaka (JP); Naoto Onodera, Hirakata (JP); Yuji Yokoyama, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 140 days.

(21) Appl. No.: 14/941,002

(22) Filed: Nov. 13, 2015

(65) Prior Publication Data

US 2016/0141628 A1    May 19, 2016

(30) Foreign Application Priority Data

Nov. 19, 2014 (JP) .................................. 2014-234831
May 15, 2015 (JP) .................................. 2015-100002

(51) Int. Cl.
*H01M 4/62* (2006.01)
*H01M 4/70* (2006.01)
(Continued)

(52) U.S. Cl.
CPC .............. *H01M 4/628* (2013.01); *H01M 4/70* (2013.01); *H01M 10/052* (2013.01);
(Continued)

(58) Field of Classification Search
CPC .......... H01M 10/0569; H01M 10/052; H01M 2220/20; H01M 4/70; H01M 10/0525; H01M 4/628
(Continued)

(56) References Cited

U.S. PATENT DOCUMENTS

2011/0159172 A1    6/2011    Yamamoto
2011/0259172 A1    6/2011    Yamamoto
(Continued)

FOREIGN PATENT DOCUMENTS

| EP | 2784848 A1 | 10/2014 |
|----|------------|---------|
| JP | 2011-210461 A | 10/2011 |
| JP | 5204929 B1 | 6/2013 |

*Primary Examiner* — Jonathan Jelsma
*Assistant Examiner* — Omar Kekia
(74) *Attorney, Agent, or Firm* — Sughrue Mion, PLLC (57) ABSTRACT

A nonaqueous electrolyte secondary battery includes: a negative electrode current collector foil; and a negative electrode mixture layer that is arranged on the negative electrode current collector foil. The negative electrode mixture layer contains a plurality of granulated particles. Each of the granulated particles contains a negative electrode active material and a coating film. The coating film is formed on a surface of the negative electrode active material. The coating film includes a first film and a second film. The first film is formed on the surface of the negative electrode active material. The second film is formed on the first film. The first film contains a carboxymethyl cellulose polymer. The second film contains a polyacrylic acid polymer.

8 Claims, 6 Drawing Sheets

(51) Int. Cl.
*H01M 10/0525* (2010.01)
*H01M 10/052* (2010.01)
*H01M 10/0569* (2010.01)

(52) U.S. Cl.
CPC ... *H01M 10/0525* (2013.01); *H01M 10/0569* (2013.01); *H01M 2220/20* (2013.01)

(58) Field of Classification Search
USPC .......................................................... 429/212
See application file for complete search history.

(56) References Cited

U.S. PATENT DOCUMENTS

| | | | |
|---|---|---|---|
| 2011/0200886 A1* | 8/2011 | Deguchi | H01M 4/133 429/331 |
| 2013/0302701 A1 | 11/2013 | Deguchi | |
| 2014/0227602 A1* | 8/2014 | Sumida | H01M 2/145 429/246 |
| 2015/0287989 A1* | 10/2015 | Hirose | H01M 4/485 429/217 |

* cited by examiner

NONAQUEOUS ELECTROLYTE SECONDARY BATTERY AND METHOD OF MANUFACTURING THE SAME

INCORPORATION BY REFERENCE

The disclosure of Japanese Patent Application No. 2014-234831 and 2015-100002 filed on Nov. 19, 2014 and May 15, 2015 including the specification, drawings and abstract is incorporated herein by reference in its entirety.

BACKGROUND OF THE INVENTION

1. Field of the Invention

The invention relates to a nonaqueous electrolyte secondary battery and a method of manufacturing the same.

2. Description of Related Art

Japanese Patent Application Publication No. 2011-210461 (JP 2011-210461 A) discloses a carbon material for a nonaqueous electrolyte secondary battery in which a layer, which is formed of a composition containing a water-soluble polymer, and a layer, which is formed of a composition containing a water-insoluble polymer, are laminated in this order on a surface of a negative electrode active material. According to JP 2011-210461 A, by forming a multi-layer coating film containing the water-soluble polymer and the water-insoluble polymer in this order on the negative electrode active material, a side reaction between the negative electrode active material and an electrolytic solution can be suppressed. As a result, improvement of storage durability can be expected. In this carbon material, the water-soluble polymer is arranged on the inner side of the water-insoluble polymer. As a result, even when the carbon material is dispersed in an aqueous solvent to obtain a slurry, the multi-layer structure can be maintained without the water-soluble polymer being dissolved.

However, in the above-described configuration, in order to prevent contact between the water-soluble polymer and the aqueous solvent, it is necessary to increase the coverage of the water-insoluble polymer. In general, the water-insoluble polymer is likely to inhibit movement of lithium (Li) ions. Therefore, when the periphery of the negative electrode active material is covered with the water-insoluble polymer, the acceptability of Li ions may decrease. In particular, when the carbon material is applied to an application such as a vehicle in which high-rate (high-current) charging and discharging is required, a decrease in the acceptability of Li ions may lead to a decrease in cycle durability.

SUMMARY OF THE INVENTION

The invention provides: a nonaqueous electrolyte secondary battery capable of simultaneously improving cycle durability and storage durability; and a method of manufacturing the same.

A first aspect of the invention is a nonaqueous electrolyte secondary battery. The nonaqueous electrolyte secondary battery includes: a negative electrode current collector foil; and a negative electrode mixture layer that is arranged on the negative electrode current collector foil. The negative electrode mixture layer contains a plurality of granulated particles. Each of the granulated particles contains a negative electrode active material and a coating film. The coating film is formed on a surface of the negative electrode active material. The coating film includes a first film and a second film. The first film is formed on the surface of the negative electrode active material. The second film is formed on the first film. The first film contains a carboxymethyl cellulose polymer. The second film contains a polyacrylic acid polymer.

In the first aspect of the invention, the multi-layer coating film containing the carboxymethyl cellulose polymer (hereinafter, referred to as "CMC polymer") and the polyacrylic acid polymer (hereinafter, referred to as "PAA polymer") in this order is formed on the negative electrode active material.

The PAA polymer promotes desolvation of Li ions. As a result, improvement of acceptability of Li ions and improvement of cycle durability can be expected. On the other hand, the PAA polymer has high reactivity with the negative electrode active material. Accordingly, if the PAA polymer comes into contact with the negative electrode active material, storage durability decreases. Therefore, in the above-described nonaqueous electrolyte secondary battery, the first film containing the CMC polymer is formed on the negative electrode active material, and the second film containing the PAA polymer is formed on the first film. According to this laminate configuration, contact between the PAA polymer and the negative electrode active material can be suppressed. The CMC polymer has a low effect of promoting desolvation of Li ions but has low reactivity with the negative electrode active material. Therefore, according to this laminate configuration, cycle durability and storage durability can be simultaneously improved.

However, both the CMC polymer and the PAA polymer are water-soluble polymers. Therefore, when the CMC polymer and the PAA polymer are dispersed in an aqueous solvent to obtain a slurry as in the related art, the laminate configuration cannot be maintained because the CMC polymer and the PAA polymer are mutually dissolved. When the laminate configuration collapses, the effects expected from each of the CMC polymer and the PAA polymer are reduced.

Thus, in the above-described nonaqueous electrolyte secondary battery, the negative electrode mixture layer is formed of a granulated body. The granulated body is an aggregate of the granulated particle. The granulated body can be prepared using a less amount of a solvent than that in the slurry. By adopting the granulated body, the negative electrode mixture layer can be formed without undergoing a state the negative electrode active material is dispersed in a solvent. As a result, the laminate configuration which includes the first film containing the CMC polymer and the second film containing the PAA polymer can be formed in the negative electrode mixture layer.

In the first aspect of the invention, when measured using X-ray photoelectron spectroscopy, a thickness of the first film may be not less than 0.05 μm and not more than 0.30 μm. According to this configuration, improvement of cycle durability and storage durability can be expected.

In the above configuration, when measured using X-ray photoelectron spectroscopy, the thickness of the first film may be not less than 0.05 μm and not more than 0.15 μm. According to this configuration, improvement of low-temperature charging characteristics after high-rate cycles can be expected.

In the first aspect of the invention, when measured using X-ray photoelectron spectroscopy, a thickness of the second film may be not less than 0.20 μm and not more than 1.00 μm. According to this configuration, improvement of cycle durability and storage durability can be expected.

In the above configuration, when measured using X-ray photoelectron spectroscopy, the thickness of the second film may be not less than 0.40 μm and not more than 1.00 μm.

According to this configuration, further improvement of cycle durability can be expected.

A second aspect of the invention is a method of manufacturing a nonaqueous electrolyte secondary battery. The method includes: forming first films on respective surfaces of negative electrode active materials, the first films containing a carboxymethyl cellulose polymer; forming second films on the respective first films, the second films containing a polyacrylic acid polymer; obtaining a granulated body containing a plurality of granulated particles by granulating the negative electrode active materials including the first films and the second films; obtaining a negative electrode mixture layer by forming the granulated body into a sheet shape; and arranging the negative electrode mixture layer on a negative electrode current collector foil.

By adopting the above-described granulated body, the negative electrode mixture layer can be formed without undergoing a step of obtaining a slurry. As a result, the laminate configuration which includes the first film and the second film can be formed in the negative electrode mixture layer.

In the second aspect of the invention, a solid content proportion of the granulated body may be not less than 65 mass % and not more than 85 mass %.

The solid content proportion refers to the mass proportion of components of the mixture excluding liquid (solvent). By adjusting the solid content proportion of the granulated body to be not less than 65 mass % and not more than 85 mass %, improvement of productivity can be expected.

In the second aspect of the invention, a mixing amount of the carboxymethyl cellulose polymer may be not less than 0.50 parts by mass and not more than 1.07 parts by mass with respect to 100 parts by mass of the negative electrode active materials.

In the second aspect of the invention, a mixing amount of the carboxymethyl cellulose polymer may be not less than 0.36 parts by mass and not more than 1.07 parts by mass with respect to 100 parts by mass of the negative electrode active materials, and a mixing amount of the polyacrylic acid polymer may be not less than 0.50 parts by mass and not more than 1.00 part by mass with respect to 100 parts by mass of the negative electrode active materials.

According to the first aspect and the second aspect of the invention, a nonaqueous electrolyte secondary battery capable of simultaneously improving cycle durability and storage durability; and a method of manufacturing the same can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention (hereinafter, referred to as "the embodiment") will be described in detail. However, the embodiment is not limited to the following description.

Figure 2:
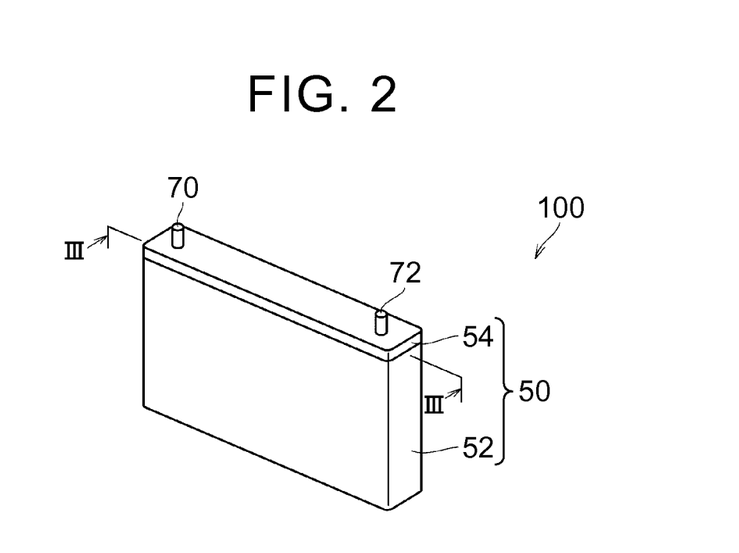
FIG. 2 is a schematic diagram showing a configuration example of a nonaqueous electrolyte secondary battery according to the embodiment of the invention.

FIG. 2 is a schematic diagram showing a configuration example of a nonaqueous electrolyte secondary battery according to the embodiment. A battery 100 shown in FIG. 2 is a sealed battery. The battery 100 includes a square housing 50. The square housing 50 includes a bottomed square case 52 and a lid 54. The square housing 50 is formed of, for example, an aluminum (Al) alloy. The case 52 and the lid 54 are joined to each other by, for example, laser welding. A positive electrode terminal 70 and a negative electrode terminal 72 are provided on the lid 54. The square housing 50 includes, for example, a liquid injection hole, a safety valve, and a current interrupt device (all of which are not shown).

Figure 3:
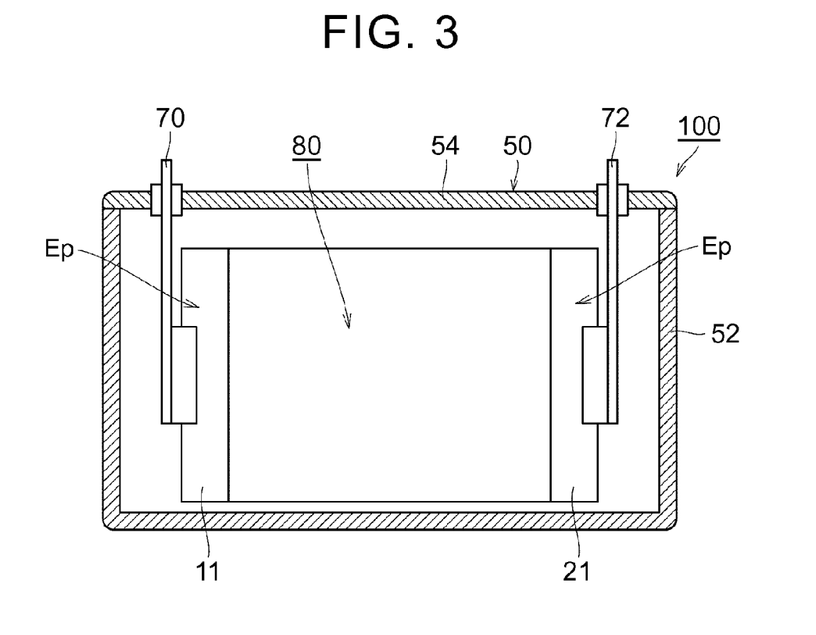
FIG. 3 is a schematic sectional view taken along line III-III of FIG. 2.

FIG. 3 is a schematic sectional view taken along line III-III of FIG. 2. As shown in FIG. 3, the square housing 50 is equipped with an electrode group 80. The electrode group 80 includes exposure portions Ep, in which a positive electrode current collector foil 11 and a negative electrode current collector foil 21 are exposed, at opposite ends in a width direction thereof. The electrode group 80 is electrically connected to the positive electrode terminal 70 and the negative electrode terminal 72 through the exposure portion Ep.

Figure 4:
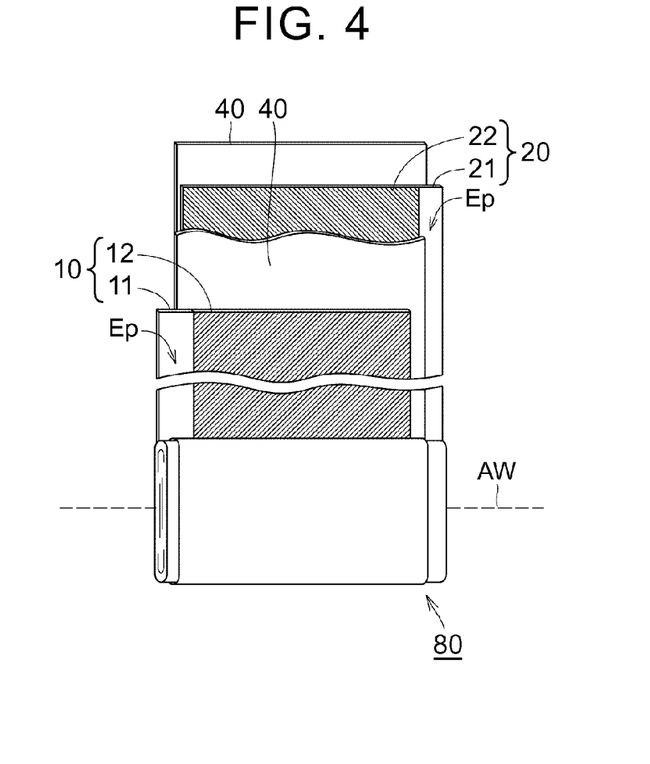
FIG. 4 is a schematic diagram showing a configuration example of an electrode group according to the embodiment of the invention.

FIG. 4 is a schematic diagram showing a configuration example of the electrode group 80. As shown in FIG. 4, the electrode group 80 is a wound electrode group. The electrode group 80 includes a separator 40, a positive electrode 10, and a negative electrode 20.

Figure 5:
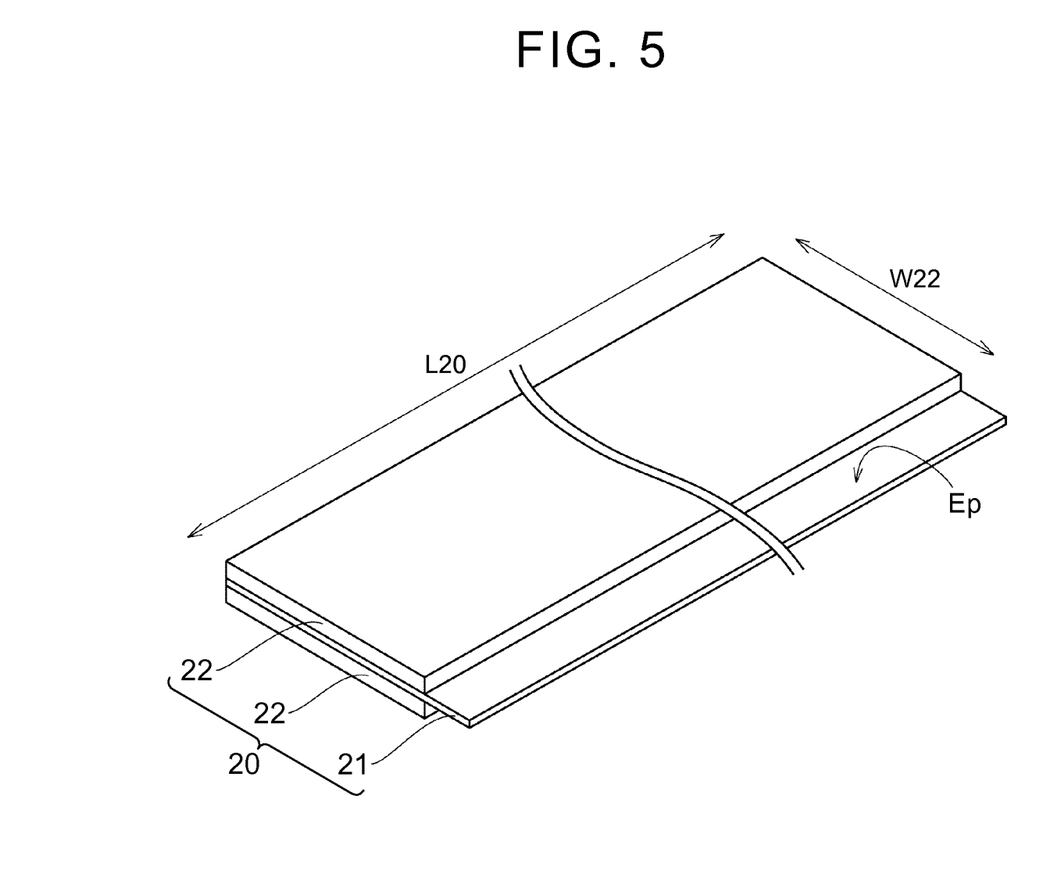
FIG. 5 is a schematic diagram showing a configuration example of a negative electrode according to the embodiment of the invention.

FIG. 5 is a schematic diagram showing a configuration example of the negative electrode 20. As shown in FIG. 5, the negative electrode 20 is an elongated belt-shaped sheet member. The negative electrode 20 includes: a negative electrode current collector foil 21; and a negative electrode mixture layer 22 that is arranged on the negative electrode current collector foil 21. The negative electrode mixture layer 22 is arranged on both main surfaces of the negative electrode current collector foil 21. The negative electrode current collector foil 21 is, for example, copper (Cu) foil. The negative electrode 20 includes the exposure portion Ep where the negative electrode current collector foil 21 is exposed. As described above, the exposure portion Ep is provided for connection to an external terminal.

The negative electrode mixture layer 22 contains a plurality of granulated particles. That is, the negative electrode mixture layer 22 is formed of a granulated body. By observing a surface or a section of the negative electrode mixture layer using a scanning electron microscope (SEM) or the like, it can be verified that the negative electrode mixture layer contains granulated particles. At this time, when it is assumed that the negative electrode mixture layer is a stone wall, the granulated particles are observed as with stones constituting the granulated particles.

The granulated particles contain a negative electrode active material, a CMC polymer, a PAA polymer, and a binder. The CMC polymer and the PAA polymer form a coating film on the negative electrode active material.

In the embodiment, the negative electrode active material is not particularly limited. For example, the negative electrode active material may be a carbon negative electrode active material such as graphite or coke, or an alloy negative electrode active material of silicon (Si), tin (Sn), and the like. The average particle size of the negative electrode active material may be, for example, not less than 5 μm and not more than 30 μm. The lower limit of the average particle size of the negative electrode active material may be 10 μm or 15 μm. The upper limit of the average particle size of the negative electrode active material may be 25 μm or 20 μm. By adjusting the average particle size to be within the above-described range, the coating film may be easily formed. Here, "average particle size" refers to a particle size (so-called "D50") corresponding to a cumulative value of 50% in a particle size distribution measured using a laser diffraction scattering method.

Figure 1:
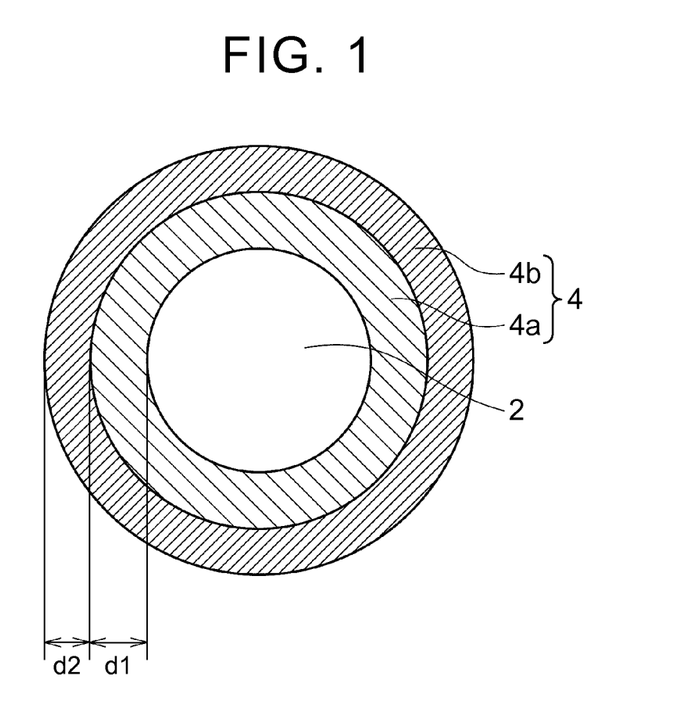
FIG. 1 is a schematic diagram showing a configuration example of a coating film according to an embodiment of the invention.

FIG. 1 is a schematic diagram showing a configuration example of the coating film. As shown in FIG. 1, a coating film 4 is formed on a surface of the negative electrode active material 2. The coating film 4 includes a first film 4a, which is formed on the surface of the negative electrode active material 2, and a second film 4b which is formed on the first film 4a. The coating film 4 may be formed in a thickness in which each of the thickness of the first film 4a and the thickness of the second film 4b can be measured using a thickness measurement method described below. However, it is not necessary that the coating film 4 is uniformly formed on the entire surface of the negative electrode active material 2.

The first film contains a CMC polymer. The CMC polymer is a cellulose derivative. The CMC polymer is produced, for example, by carboxymethylation of natural cellulose. The degree of etherification of the CMC polymer may be, for example, about 0.5 to 2.0. The CMC polymer is water-soluble. When the viscosity of an aqueous solution containing 1 mass % of the CMC polymer may be, for example, about 1 Pa·s to 10 Pa·s. As a result, the thickness of the first film may be highly uniform. The viscosity of the 1 mass % aqueous solution can be measured at 25° C. using a Brookfield viscometer. The rotor speed of the Brookfield viscometer is about 30 rpm to 60 rpm.

Examples of the CMC polymer include carboxymethyl cellulose, an alkali metal salt of carboxymethyl cellulose (CMC), an alkali earth metal salt of carboxymethyl cellulose, an ammonium salt of carboxymethyl cellulose. That is, the CMC polymer may be at least one selected from the group consisting of carboxymethyl cellulose, an alkali metal salt of carboxymethyl cellulose (CMC), an alkali earth metal salt of carboxymethyl cellulose, an ammonium salt of carboxymethyl cellulose. From the viewpoint of handleability, it is preferable that the CMC polymer is a sodium (Na) salt of carboxymethyl cellulose. The weight average molecular weight of the Na salt of carboxymethyl cellulose may be, for example, about 200,000 to 400,000. The weight average molecular weight can be measured, for example, by gel permeation chromatography (GPC). The first film may contain a material other than the CMC polymer. However, it is preferable that the first film consists of only the CMC polymer.

In FIG. 1, the thickness of the first film 4a is shown as d1. The thickness of the first film may be not less than 0.05 μm and not more than 0.30 μm. As a result, improvement of cycle durability and storage durability can be expected. The lower limit of the thickness of the first film may be 0.07 μm or 0.10 μm. The upper limit of the thickness of the first film may be 0.15 μm. That is, the thickness of the first film may be not less than 0.05 μm and not more than 0.15 μm. By adjusting the thickness of the first film to be 0.15 μm or less, improvement of low-temperature charging characteristics after high-rate cycles can be expected. The method of measuring a thickness will be described below.

The mixing amount of the CMC polymer for forming the first film may be not less than 0.36 parts by mass and not more than 2.14 parts by mass with respect to 100 parts by mass of the negative electrode active material. Within this range, the first film is likely to have the above-described thickness. The lower limit of the mixing amount of the CMC polymer may be 0.50 parts by mass or 0.71 parts by mass. The upper limit of the mixing amount of the CMC polymer may be 1.07 parts by mass.

The second film contains the PAA polymer. Examples of the PAA polymer include a polymer obtained by polymerization of an acrylic acid monomer; a polymer obtained by copolymerization of acrylic acid and a monomer which is copolymerizable with acrylic acid; and an alkali metal salt and an ammonium salt thereof. That is, the PAA polymer may be at least one selected from the group consisting of polyacrylic acid, an alkali metal salt of polyacrylic acid, an ammonium salt of polyacrylic acid, a copolymer containing a structural unit derived from acrylic acid, an alkali metal salt of a copolymer containing a structural unit derived from acrylic acid, and an ammonium salt of a copolymer containing a structural unit derived from acrylic acid. Examples of the monomer which is copolymerizable with acrylic acid include maleic acid and sulfonic acid. Examples of the alkali metal salt include a Na salt. The PAA polymer is water-soluble. When the viscosity of an aqueous solution containing 1 mass % of the PAA polymer may be, for example, about 100 Pa·s to 1500 Pa·s. As a result, the uniformity of the thickness of the second film may be improved. From the viewpoint of handleability, the PAA polymer is preferably polyacrylic acid. The weight average molecular weight of the polyacrylic acid may be, for example, about 50,000 to 100,000. The second film may contain a material other than the PAA polymer. However, it is preferable that the second film consists of only the PAA polymer.

In FIG. 1, the thickness of the second film 4b is shown as d2. It is preferable that d2 is thicker than d1 described above. For example, d2 and d1 may satisfy a relationship of 4×d1≤d2≤16×d1. By satisfying this relationship, a balance between cycle durability and storage durability may be improved. The thickness of the second film may be not less than 0.2 μm and not more than 1.00 μm. As a result, improvement of cycle durability and storage durability can be expected. The lower limit of the thickness of the second film may be 0.40 μm. That is, the thickness of the second film may be not less than 0.40 μm and not more than 1.00 μm. By adjusting the thickness of the second film to be 0.40 μm or more, further improvement of cycle durability can be expected. The lower limit of the thickness of the second film may be 0.50 μm. The upper limit of the thickness of the second film may be 0.80 μm.

The mixing amount of the PAA polymer for forming the second film may be not less than 0.25 parts by mass and not more than 1.25 parts by mass with respect to 100 parts by mass of the negative electrode active material. Within this range, the second film is likely to have the above-described thickness. The lower limit of the mixing amount of the PAA polymer may be 0.50 parts by mass. The upper limit of the mixing amount of the PAA polymer may be 1.00 part by mass or 0.75 parts by mass.

The thickness of the first film and the thickness of the second film can be measured by X-ray photoelectron spectroscopy (XPS). For the measurement, an X-ray photoelectron spectrometer is used. The negative electrode mixture layer which is a measurement object, the granulated particle or the negative electrode active material may be arranged on a sample stand such that the surface thereof is flat. As an X-ray source, AlKα rays may be used. A case where the negative electrode active material is graphite, the first film is formed of a Na salt of CMC, and the second film is formed of PAA will be described as an example. In this case, the thickness can be measured by using Na as an index. By multiplex measurement (simultaneous multicomponent analysis), the elemental composition in a depth direction is analyzed. At this time, the distance from the outermost surface of the sample to a depth position where Na is detected is set as the thickness of the second film. Further, the distance from the depth position where Na is detected to a depth position where graphite is detected is set as the thickness of the first film. When the first film does not contain Na, an element as an index may be appropriately set. It is preferable that the element as an index is contained in the first film and is not contained in the negative electrode active material and the second film.

The binder is not particularly limited, and it is preferable that the binder has high dispersibility in an aqueous solvent. For example, the binder may be styrene-butadiene rubber (SBR) or polytetrafluoroethylene (PTFE). The mixing amount of the binder may be about 0.5 parts by mass to 2 parts by mass with respect to 100 parts by mass of the negative electrode active material. As described below, after the formation of the first film and the second film, the binder according to the embodiment is added under conditions where the amount of the solvent is small. Therefore, it is difficult to cover the negative electrode active material with the binder. As a result, improvement of acceptability of Li ions can be expected.

In the embodiment, the negative electrode mixture layer is formed of the granulated body. Therefore, the binder is uniformly distributed in the thickness direction of the negative electrode mixture layer. As a result, diffusion of Li ions is promoted, and reduction in battery resistance can be expected. On the other hand, in a negative electrode mixture layer which is formed of a slurry containing a large amount of a solvent, the binder is segregated on the surface side due to binder migration. Accordingly, based on the distribution of the binder in the thickness direction, the negative electrode mixture layer formed of the granulated body can also be distinguished from the negative electrode mixture layer formed of the slurry. The distribution of the binder in the thickness direction of the negative electrode mixture layer can be evaluated based on, for example, a migration index.

The migration index can be calculated by SEM-EDX analysis of a section of the negative electrode mixture layer. Here, EDX is an abbreviation of "Energy Dispersive X-ray spectrometery". The measurement procedure is as follows. First, a sample for section observation is cut from the negative electrode mixture layer, and a section of the sample is cleaned using a cross-section polisher. Next, the binder is modified with a predetermined element or compound. For example, in a binder, such as SBR, containing a carbon-carbon double bond, the double bond can be modified with, for example, bromine (Br). After the binder is modified, the section is analyzed by SEM-EDX for mapping of Br. At this time, the section is divided into two regions in the thickness direction including: a first region that is positioned on the negative electrode current collector foil side; and a second region that is positioned on the surface of the negative electrode mixture layer. The migration index can be calculated by dividing an integrated value of detected intensity of BR in the second region by an integrated value of detected intensity of BR in the first region. When the binder is uniformly dispersed, the migration index is close to 1.0.

In the embodiment, since the negative electrode mixture layer is formed of the granulated body, the migration index becomes not less than 0.7 and not more than 1.2. On the other hand, in the negative electrode mixture layer formed of the slurry, the migration index exceeds 1.5.

Figure 6:
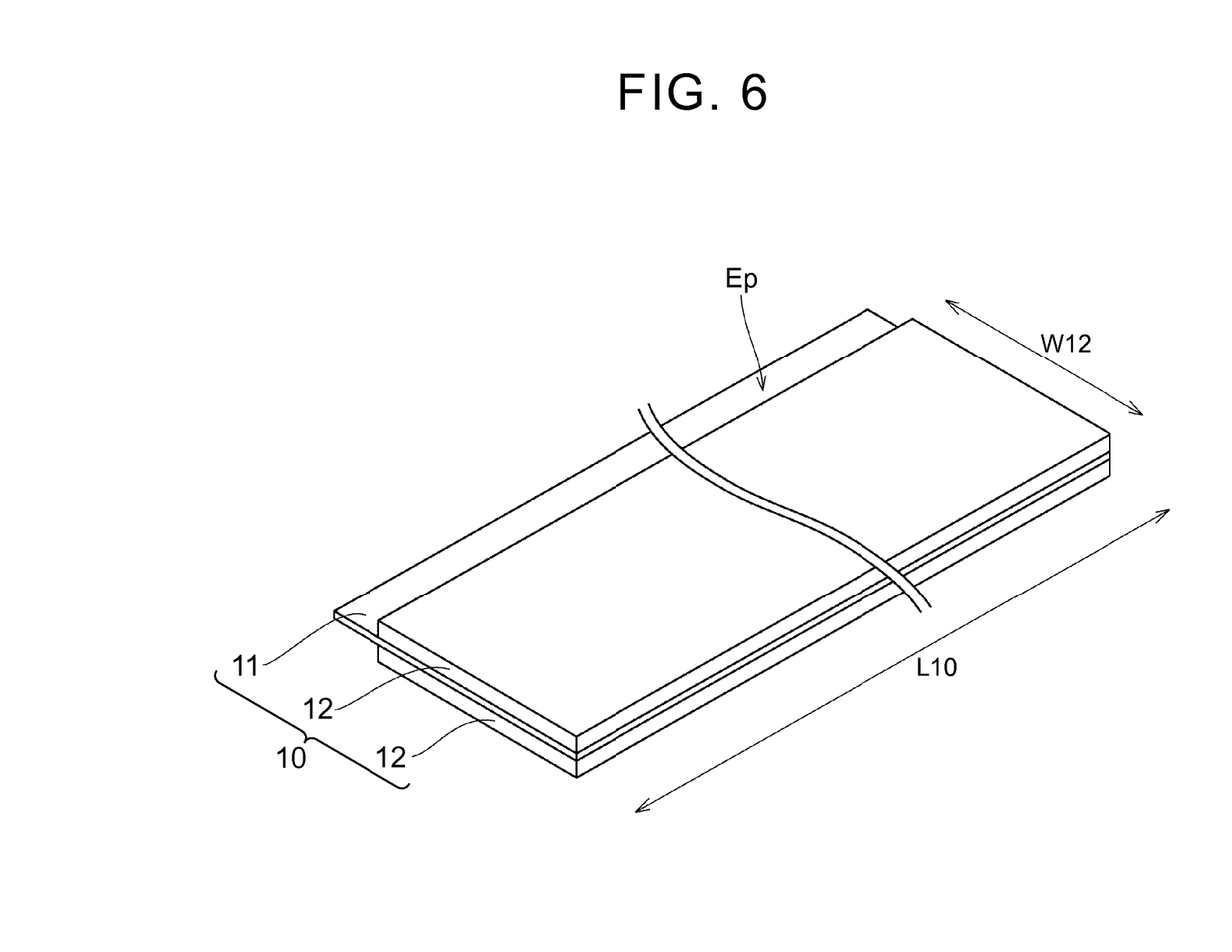
FIG. 6 is a schematic diagram showing a configuration example of a positive electrode according to the embodiment of the invention.

FIG. 6 is a schematic diagram showing a configuration example of the positive electrode 10. As shown in FIG. 6, the positive electrode 10 is an elongated belt-shaped sheet member. The positive electrode 10 includes: a positive electrode current collector foil 11; and a positive electrode mixture layer 12 that is arranged on both main surfaces of the positive electrode current collector foil 11. The positive electrode current collector foil 11 is formed of, for example, Al foil. The positive electrode 10 includes the exposure portion Ep where the positive electrode current collector foil 11 is exposed. As described above, the exposure portion Ep is provided for connection to an external terminal.

The positive electrode mixture layer 12 may be formed of a granulated body or a slurry. The positive electrode mixture layer 12 contains a positive electrode active material, a conductive material, and a binder. The positive electrode active material is not particularly limited, and any material which can function as a positive electrode active material of a nonaqueous electrolyte secondary battery can be used. For example, the positive electrode active material may be $LiCoO_2$, $LiNiO_2$, $LiNi_aCo_bO_2$ (wherein, a+b=1, 0<a<1, and 0<b<1), $LiMnO_2$, $LiMn_2O_4$, $LiNi_aCo_bMn_cO_2$ (wherein, a+b+c=1, 0<a<1, 0<b<1, and 0<c<1), or $LiFePO_4$.

For example, the conductive material may be amorphous carbon such as acetylene black (AB) or graphite. The mixing amount of the conductive material may be, for example, about 1 part by mass to 10 parts by mass with respect to 100 parts by mass of the positive electrode active material. For example, the binder may be polyvinylidene fluoride (PVDF) or PTFE. The mixing amount of the binder may be, for example, about 1 parts by mass to 10 parts by mass with respect to 100 parts by mass of the positive electrode active material.

The separator 40 prevents electrical contact between the positive electrode 10 and the negative electrode 20 while allowing penetration of Li ions. As the separator, a microporous membrane formed of a polyolefin material is preferable from the viewpoints of mechanical strength and chemical stability. For example, the separator may be a microporous membrane formed of polyethylene (PE), polypropylene (PP), or the like.

In the separator, plural microporous membranes may be laminated, or a heat resistance layer containing an inorganic filler (for example, alumina particles) may be formed on the surface thereof. The thickness of the separator may be, for example, 5 μm to 40 μm. The pore size and porosity of the separator may be appropriately adjusted such that the air permeability is a desired value.

The electrolytic solution is an electrolytic solution in which a Li salt is dissolved in an aprotic solvent. The aprotic solvent may be: a cyclic carbonate such as ethylene carbonate (EC), propylene carbonate (PC), butylene carbonate (BC), or γ-butyrolactone (γBL); or may be a chain carbonate such as dimethyl carbonate (DMC), ethyl methyl carbonate (EMC), or diethyl carbonate (DEC). Among these aprotic solvents, a combination of two or more kinds may be used from the viewpoints of electrical conductivity and electrochemical stability. A mixture of a cyclic carbonate and a chain carbonate may be used. At this time, a volume ratio of a cyclic carbonate to a chain carbonate may be about 1:9 to 5:5.

For example, the Li salt may be lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide ($Li(CF_3SO_2)_2N$), lithium bis(fluorosulfonyl)imide ($Li(FSO_2)_2N$), or lithium trifluoromethanesulfonate ($LiCF_3SO_3$). Among these Li salts, a combination of two or more kinds may be used. The concentration of the Li salt in the electrolytic solution may be about 0.5 mol/L to 2.0 mol/L.

The electrolytic solution may contain additives having various functions. For example, the electrolytic solution may contain an additive for promoting or suppressing the formation of a solid electrolyte interface (SEI). For example, the electrolytic solution may contain lithium bis(oxalato)borate ($LiB(C_2O_4)_2$; also abbreviated as "LIBOB"), lithium difluoro(oxalato)borate ($LiBF_2(C_2O_4)$), lithium difluorobis(oxalato)phosphate ($LiPF_2(C_2O_4)_2$), lithium difluorophosphate ($LiPO_2F_2$), vinylene carbonate (VC), vinyl ethylene carbonate (VEC), fluoroethylene carbonate (FEC), ethylene sulfite (ES), or propane sultone (PS).

The electrolytic solution may contain an additive for promoting an increase in internal pressure during overcharge. For example, the electrolytic solution may contain cyclohexylbenzene (CHB), biphenyl (BP), biphenyl ether (BPE), tert-butylbenzene (TBB), or tert-amylbenzene (TAB). The addition amount of the additives may be about not less than 0.1 parts by mass and not more than 5.0 parts by mass with respect to 100 parts by mass of the electrolytic solution.

Figure 7:
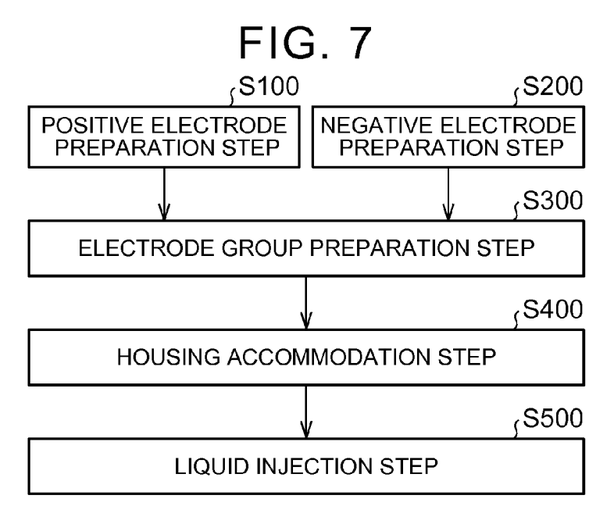
FIG. 7 is a flowchart showing the summary of a method of manufacturing the nonaqueous electrolyte secondary battery according to the embodiment of the invention.

The nonaqueous electrolyte secondary battery according to the embodiment may be manufactured, for example, using the following manufacturing method. FIG. 7 is a flowchart showing the summary of a method of manufacturing the nonaqueous electrolyte secondary battery according to the embodiment of the invention. As shown in FIG. 7, the manufacturing method includes, a positive electrode preparation step S100, a negative electrode preparation step S200, an electrode group preparation step S300, a housing accommodation step S400, and a liquid injection step S500. Hereinafter, each step will be described.

Figure 8:
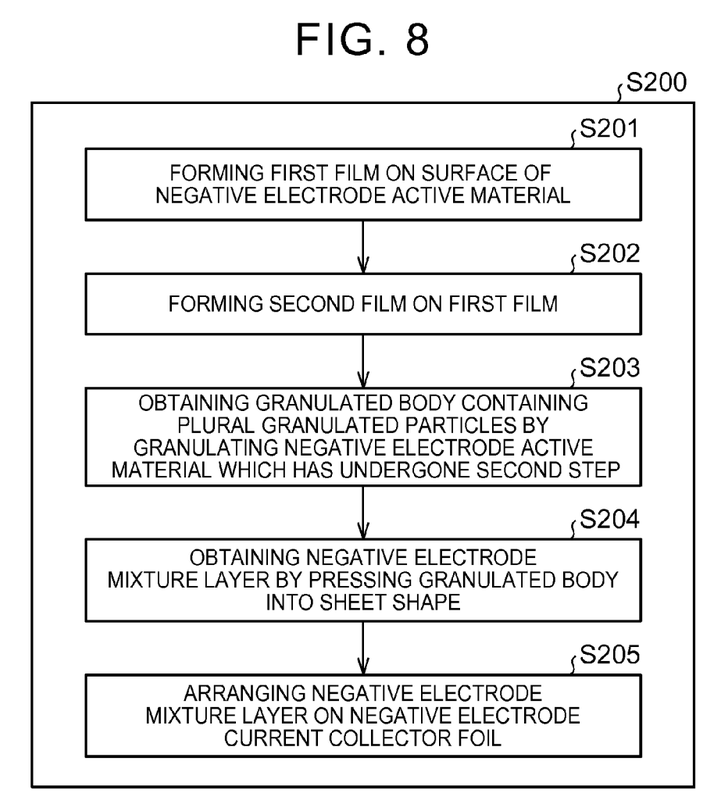
FIG. 8 is a flowchart showing the summary of a negative electrode preparation step according to the embodiment of the invention.

In the negative electrode preparation step S200, the negative electrode 20 shown in FIG. 5 is prepared. FIG. 8 is a flowchart showing the summary of the negative electrode preparation step S200. As shown in FIG. 8, the negative electrode preparation step S200 includes a first step S201, a second step S202, a third step S203, a fourth step S204, and a fifth step S205. Accordingly, the method of manufacturing the nonaqueous electrolyte secondary battery includes these steps.

In the first step S201 and the second step S202, a laminated coating film is formed on the surface of the negative electrode active material through a multi-step mixing treatment. In the first step S201, the first film containing the CMC polymer is formed on the surface of the negative electrode active material. For example, the first film can be formed on the surface of the negative electrode active material by mixing the negative electrode active material, the CMC polymer, and the solvent with each other under predetermined conditions. For mixing, a general mixer can be used. For example, "HIGH-SPEED MIXER" manufactured by EARTHTECHNICA Co., Ltd. is preferably used. The HIGH-SPEED MIXER can be used in the first step S201 to the third step S203. When the HIGH-SPEED MIXER is used, mixing conditions in the first step S201 are, for example, as follows.

Mixing amount of CMC polymer: about 0.36 parts by mass to 2.14 parts by mass with respect to 100 parts by mass of negative electrode active material Solid content proportion: about 83 mass % to 87 mass %

Rotating speed of agitator blade: about 200 rpm to 400 rpm

Rotating speed of chopper blade: about 1400 rpm to 1600 rpm

Mixing time: about 3 minutes to 10 minutes

As a result, a granular mixture in which the CMC polymer (first film) is attached to the surface of the negative electrode active material is obtained. For convenience of description, this granular mixture will be referred to as "first coating material".

In the second step S202, the second film containing the PAA polymer is formed on the first film. For example, the PAA polymer and the solvent are added to the first coating material, and the components are mixed with each other under predetermined conditions. As a result, the second film containing the PAA polymer can be formed on the first film. Mixing conditions in the second step S202 are, for example, as follows.

Mixing amount of PAA polymer: about 0.25 parts by mass to 1.25 parts by mass with respect to 100 parts by mass of negative electrode active material Solid content proportion: about 78 mass % to 82 mass %

Rotating speed of agitator blade: about 200 rpm to 400 rpm

Rotating speed of chopper blade: about 1100 rpm to 1300 rpm

Mixing time: about 3 minutes to 10 minutes

As a result, a granular mixture in which the PAA polymer (second film) is attached to the first film is obtained. For convenience of description, this granular mixture will be referred to as "second coating material".

In the third step S203, the negative electrode active material which has undergone the second step S202, that is, the second coating material is granulated. As a result, a granulated body containing plural granulated particle is prepared. For example, the binder and the solvent are added to the second coating material, and the components are mixed with each other under predetermined conditions. As a result, a granulated body can be prepared. Mixing conditions in the third step S203 are, for example, as follows.

Mixing amount of binder: about 0.5 parts by mass to 2.0 parts by mass with respect to 100 parts by mass of negative electrode active material Solid content proportion: about 65 mass % to 75 mass %

Rotating speed of agitator blade: about 200 rpm to 300 rpm

Rotating speed of chopper blade: about 2000 rpm to 3000 rpm

Mixing time: about 3 minutes to 10 minutes

As a result, a granulated body containing plural granulated particle is obtained. Each of the obtained granulated particles contains a negative electrode active material and a coating film. The coating film includes a first film, which is formed on the surface of the negative electrode active material, and a second film which is formed on the first film.

Figure 9:
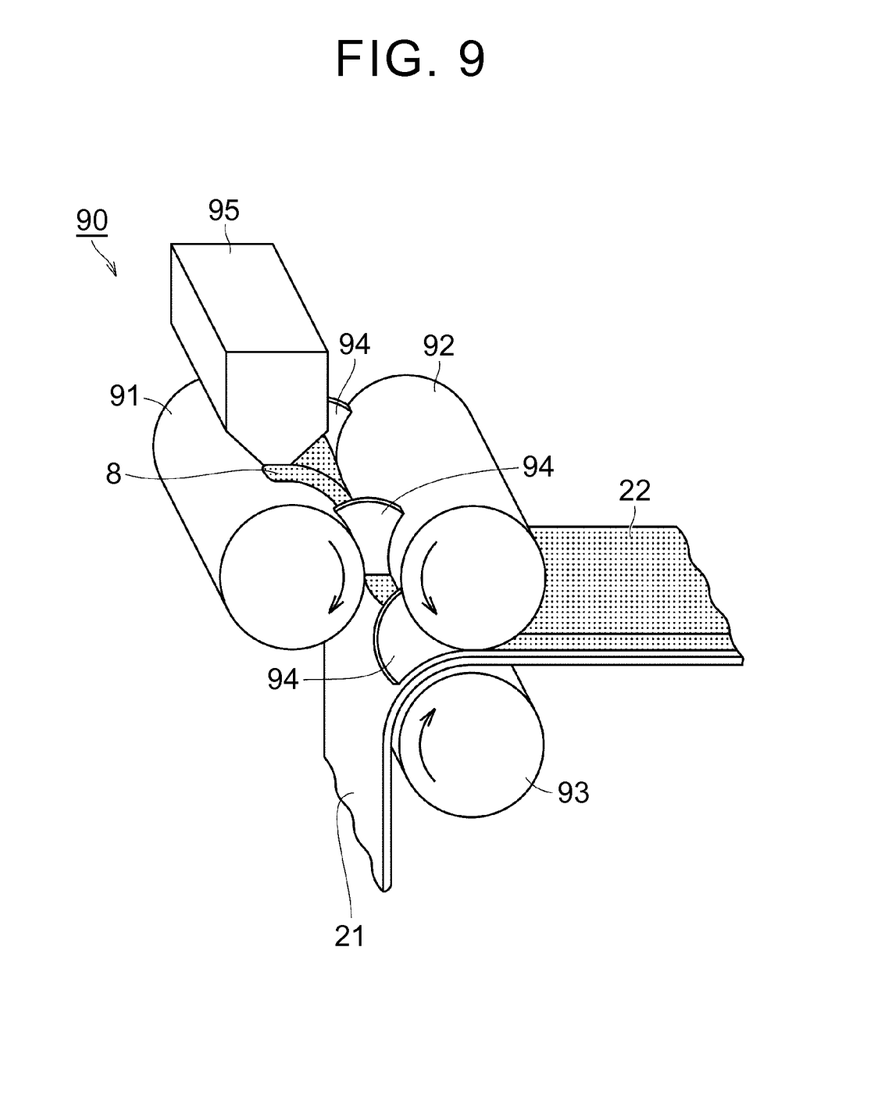
FIG. 9 is a schematic diagram showing a fourth step and a fifth step according to the embodiment of the invention.

In the fourth step S204, a negative electrode mixture layer is formed by pressing the granulated body into a sheet shape. FIG. 9 is a schematic diagram showing the fourth step S204 and the fifth step S205. The granulated body containing plural granulated particles is supplied to a feeder 95 of an electrode preparation device 90 shown in FIG. 9. The granulated body 8 is supplied from the feeder 95 onto an A roller 91. In FIG. 9, arrows indicate rotating directions of the respective roller members. The granulated body 8 is transported along the A roller 91 in the arrow direction and reaches a gap between the A roller 91 and a B roller 92. In the gap, pressure is applied from the A roller 91 and the B roller 92 to the granulated body 8 such that the granulated body 8 is formed into the sheet shaped negative electrode mixture layer 22. The width of the negative electrode mixture layer 22 is adjusted by partition members 94. The coating weight (mass per unit area) of the negative electrode mixture layer 22 is adjusted by the gap between the A roller 91 and the B roller 92.

In the fifth step S205, the negative electrode mixture layer is arranged on the negative electrode current collector foil. As shown in FIG. 9, the negative electrode mixture layer 22 which has been formed into a sheet shape is transported along the B roller 92 in the arrow direction. The negative electrode current collector foil 21 is transported along a C roller 93 in the arrow direction. In the gap between the B roller 92 and the C roller 93, pressure is applied from the B roller 92 and the C roller 93 to the negative electrode mixture layer 22 and the negative electrode current collector foil 21 such that the negative electrode mixture layer 22 is transferred from the B roller 92 to one main surface of the negative electrode current collector foil 21. Concurrently, the negative electrode mixture layer 22 is pressure-bonded to the negative electrode current collector foil 21. Next, the negative electrode mixture layer 22 is dried in a drying furnace (not shown).

Using the same method as described above, the negative electrode mixture layer 22 is arranged on a main surface of the negative electrode current collector foil 21 opposite the above-described main surface. The negative electrode mixture layer 22 is pressed into a predetermined thickness. The negative electrode mixture layer 22 and the negative electrode current collector foil 21 are processed to have a predetermined dimension. In this way, the negative electrode 20 shown in FIG. 5 is completed.

In the positive electrode preparation step S100, the positive electrode 10 shown in FIG. 6 is prepared. The positive electrode 10 can be prepared, for example, as follows. The positive electrode active material, the conductive material, and the binder are kneaded with each other in N-methyl-2-pyrrolidone (NMP) to obtain a positive electrode slurry. Using a die coater or the like, the positive electrode slurry is applied to a predetermined position on the positive electrode current collector foil 11. The coating film is dried to form the positive electrode mixture layer 12. Using a rolling mill or the like, the thickness of the positive electrode mixture layer 12 is adjusted. The positive electrode mixture layer 12 and the positive electrode current collector foil 11 are processed to have a predetermined dimension.

In the electrode group preparation step S300, the electrode group 80 is prepared. As shown in FIG. 4, the positive electrode 10 and the negative electrode 20 are arranged to face each other with the separators 40 interposed therebetween, and the components are wound around a winding axis AW. As a result, the electrode group 80 is prepared. At this time, the exposure portions of the positive electrode 10 and the negative electrode 20 are arranged in opposite end portions on the winding axis AW. The electrode group 80 is wound into an elliptical shape and then pressed into a flat shape.

In the housing accommodation step S400, as shown in FIG. 3, the electrode group 80 is accommodated in the square housing 50. At this time, the exposure portion Ep of the electrode group 80 on the positive electrode 10 side is electrically connected to the positive electrode terminal 70. Likewise, the exposure portion Ep on a negative electrode 20 side is electrically connected to the negative electrode terminal 72. The case 52 and the lid 54 are joined to each other by, for example, laser welding.

In the liquid injection step S500, the electrolytic solution (not shown) is injected into the square housing 50. For example, the electrolytic solution is injected through the liquid injection hole (not shown) provided on the square housing 50. After the injection, the liquid injection hole is sealed by predetermined sealing means.

As described above, the battery 100 shown in FIG. 2 is manufactured. The embodiment will be described using the square battery as an example. However, the embodiment is not limited to the square battery. The embodiment may be applied to a cylindrical battery or a laminate battery. The electrode group is not limited the wound electrode group. The electrode group may be a laminated electrode group. The laminated electrode group may be called "stacked electrode group". The embodiment is particularly preferable for use in a vehicle where high rate characteristics are emphasized.

Hereinafter, the embodiment will be described using Examples. However, the embodiment is not limited to the following Examples.

Using the following method, negative electrodes and nonaqueous electrolyte secondary batteries according to Samples No. 1 to 20 were prepared. In Table 1 described below, for example, samples with No. to which symbol "*" is attached, for example, "No. 15*" are comparative examples, and other samples are examples according to the embodiment.

In order to prepare a negative electrode of Sample No. 1, the following materials were prepared.

Negative electrode active material: graphite powder (D50: 20 μm)

CMC polymer: CMC powder (trade name: "MAC 500LC", manufactured by Nippon Paper Industries Co., Ltd.).

PAA polymer: PAA aqueous solution (trade name: "AQUATIC L SERIES HL", manufactured by Nippon Shokubai Co., Ltd.)

Binder: SBR aqueous dispersion (trade name: "C41", manufactured by JSR Corporation)

In the first step S201, "HIGH-SPEED MIXER" (manufactured by EARTHTECHNICA Co., Ltd.) was prepared as a mixer. Graphite powder (100 parts by mass) and CMC powder (0.5 parts by mass) were put into the HIGH-SPEED MIXER. Water was put into the HIGH-SPEED MIXER such that the solid content proportion of the mixture was 85 mass %. The components were mixed for 5 minutes by setting the rotating speed of an agitator blade to 300 rpm and setting the rotating speed of a chopper blade to 1500 rpm. As a result, a granular first coating material was obtained. The first coating material contained graphite (negative electrode active material) and a CMC film (first film) which was formed on the surface of graphite.

In the second step S202, a PAA aqueous solution and water were also put into the HIGH-SPEED MIXER. At this time, the amounts of the PAA aqueous solution and water put were adjusted such that the mixing amount of PAA was 0.5 parts by mass and the solid content proportion of the mixture was 80 mass %. The components were mixed for 5 minutes by setting the rotating speed of an agitator blade to 300 rpm and setting the rotating speed of a chopper blade to 1200 rpm. As a result, a granular second coating material was obtained. The second coating material contained the first coating material and a PAA film (second film) which is formed on the CMC film (first film).

In the third step S203, a SBR aqueous dispersion and water were also put into the HIGH-SPEED MIXER. At this time, the amounts of the aqueous dispersion and water put were adjusted such that the mixing amount of SBR was 1.0 part by mass and the solid content proportion of the mixture was 71 mass %. The components were mixed for 5 minutes by setting the rotating speed of an agitator blade to 250 rpm and setting the rotating speed of a chopper blade to 2500 rpm. As a result, a granulated body containing plural granulated particle was obtained.

In the fourth step S204 and the fifth step S205, the electrode preparation device 90 shown in FIG. 9 was prepared. Using the electrode preparation device 90, the negative electrode mixture layer 22 was obtained by pressing the granulated body into a sheet shape. Next, the negative electrode mixture layer 22 was transferred to one main surface of the negative electrode current collector foil 21. Likewise, the negative electrode mixture layer 22 was arranged on a main surface of the negative electrode current collector foil 21 opposite the above-described main surface. Next, the obtained laminate was processed to have a predetermined thickness and size to obtain the negative electrode 20 shown in FIG. 5.

The respective dimensions shown in FIG. 5 were as follows.

Thickness of negative electrode current collector foil 21 (Cu foil): 14 μm
Thickness of negative electrode 20: 150 μm
Length L20 of negative electrode 20: 4700 mm
Width W22 of negative electrode mixture layer 22: 100 mm According to the above-described method, the thicknesses of the first film and the second film which were formed on the surface of the negative electrode active material were measured. The results are shown in Table 1.

Samples No. 2 to 14, 19 and 20 were obtained using the same method as in Sample No. 1, except that the mixing amounts of CMC and PAA were changed as shown in Table 1.

In order to obtain Sample No. 15, in the third step S203, the components were mixed with each other after increasing the amount of water and decreasing the solid content proportion to 50 mass %. As a result, a slurry was obtained. Using a die coater or the like, the slurry was applied to a predetermined position on the negative electrode current collector foil. The slurry coating film was dried to form a negative electrode mixture layer. Sample No. 15 was obtained using the same method as in Sample No. 1, except for the above-described configurations. Using the same method as described above, the thicknesses of the first film and the second film were measured. However, in Sample No. 15, a boundary between the first film and the second film was not able to be detected because the first film and the second film were mutually dissolved.

Samples No. 16 to 18 were obtained using the same method as described, except that a single-layer coating film formed of PAA having a composition shown in Table 1 was directly formed on the negative electrode active material without using CMC. In Table 1, the thickness of the coating film of each of Samples No. 16 to 18 is shown in the item of the second film.

Using the negative electrodes of Samples No. 1 to 20 obtained as described above, batteries for evaluation having a rated capacity of 24 Ah were prepared.

The positive electrode 10 (refer to FIG. 6) having the next specification was prepared.

Positive electrode active material: $LiNi_{1/3}CO_{1/3}Mn_{1/3}O_2$
Conductive material: acetylene black
Binder: PVDF
Composition: (positive electrode active material:conductive material:binder=90:8:2 (mass ratio))

TABLE 1

| | Negative Electrode Mixture Layer | | | | | | | Battery Performance | | |
| --- | --- | --- | --- | --- | --- | --- | --- | --- | --- | --- |
| | Negative Electrode Active Material | First Layer | | Second Layer | | Binder | | | | |
| No. | Mixing Amount of Graphite part(s) by mass | Mixing Amount of CMC part(s) by mass | Thickness μm | Mixing Amount of PAA part(s) by mass | Thickness μm | Mixing Amount of SBR part(s) by mass | Battery Resistance mΩ | Capacity Retention after Cycles % | Capacity Retention after High-temperature Storage % | Low Temperature Resistance after High-Rate Cycles mΩ |
| 1 | 100 | 0.50 | 0.07 | 0.50 | 0.40 | 1 | 3.3 | 87.6 | 95 | 9.7 |
| 2 | 100 | 0.50 | 0.07 | 0.75 | 0.60 | 1 | 3.3 | 88.3 | 94 | 9.8 |
| 3 | 100 | 0.71 | 0.10 | 0.50 | 0.40 | 1 | 3.4 | 87.5 | 96 | 9.7 |
| 4 | 100 | 0.71 | 0.10 | 0.75 | 0.60 | 1 | 3.4 | 88.5 | 95 | 9.8 |
| 5 | 100 | 1.07 | 0.15 | 0.50 | 0.40 | 1 | 3.5 | 87.4 | 97 | 9.5 |
| 6 | 100 | 1.07 | 0.15 | 0.75 | 0.60 | 1 | 3.5 | 87.9 | 96 | 9.6 |
| 7 | 100 | 0.71 | 0.10 | 1.00 | 0.80 | 1 | 3.3 | 89.0 | 95 | 9.8 |
| 8 | 100 | 1.07 | 0.15 | 1.00 | 0.80 | 1 | 3.4 | 89.0 | 94 | 9.8 |
| 9 | 100 | 0.36 | 0.05 | 0.25 | 0.20 | 1 | 3.9 | 82.0 | 84 | 12.4 |
| 10 | 100 | 0.36 | 0.05 | 0.75 | 0.60 | 1 | 3.5 | 88.2 | 91 | 9.8 |
| 11 | 100 | 0.36 | 0.05 | 1.25 | 1.00 | 1 | 3.3 | 88.0 | 82 | 12.3 |
| 12 | 100 | 2.14 | 0.30 | 0.25 | 0.20 | 1 | 4.1 | 83.0 | 93 | 14.8 |
| 13 | 100 | 2.14 | 0.30 | 0.75 | 0.60 | 1 | 4.2 | 86.1 | 84 | 15.1 |
| 14 | 100 | 2.14 | 0.30 | 1.25 | 1.00 | 1 | 4.2 | 86.0 | 84 | 15.5 |
| 15* | 100 | 0.5 | — | 0.5 | — | 1 | 3.4 | 80.0 | 79 | 15.3 |
| 16* | 100 | 0 | — | 0.50 | 0.40 | 1 | 3.4 | 86.8 | 90 | 11.1 |
| 17* | 100 | 0 | — | 0.75 | 0.60 | 1 | 3.4 | 86.9 | 91 | 11.8 |
| 18* | 100 | 0 | — | 1.00 | 0.80 | 1 | 3.4 | 87.0 | 91 | 12.3 |
| 19 | 100 | 0.36 | 0.05 | 0.50 | 0.40 | 1 | 3.4 | 88.0 | 90 | 9.8 |
| 20 | 100 | 0.36 | 0.05 | 1.00 | 0.80 | 1 | 3.5 | 88.3 | 91 | 9.7 |

Thickness of positive electrode current collector foil 11 (Al foil): 20 μm
Thickness of positive electrode 10: 170 μm
Length L10 of positive electrode 10: 4500 mm
Width W12 of positive electrode mixture layer 12: 94 mm Using the following method, the separator 40 including a heat resistance layer on a surface thereof was prepared. As a separator substrate, a three-layer separator was prepared in which a PP microporous membrane, a PE microporous membrane, and a PP microporous membrane were laminated in this order. The thickness of the separator substrate was 25 μm. Using CLEARMIX (manufactured by M Technique Co., Ltd.), a slurry containing alumina particles and an acrylic resin was prepared. Using a gravure coater, the slurry was applied to the separator substrate. The coating film was dried to form a heat resistance layer.

As shown in FIG. 4, the separators 40, the positive electrode 10, and the negative electrode 20 were wound around the winding axis AW to prepare an elliptical electrode group. Using a flat pressing machine, the electrode group was pressed into a flat shape for two minutes at normal temperature at a pressure of 4 kN/cm$^2$. In this way, the electrode group 80 was prepared.

As shown in FIG. 3, the positive electrode terminal 70 and the negative electrode terminal 72 were connected to the electrode group 80, and then the electrode group 80 was accommodated in the square housing 50.

The following electrolytic solution was injected into the square housing 50.

Li salt: LiPF$_6$ (1.0 mol/L)
Solvent: (EC:DMC:EMC=3:4:3 (volume ratio))
Additives: LiBOB (1 part by mass), CHB (1 part by mass), and BP (1 part by mass) were added to 100 parts by mass of electrolytic solution
Injection amount: 125 g Each of the batteries was evaluated as follows. In the following description, the unit "C" for the current value refers to the current value at which the rated capacity of a battery is completely discharged in 1 hour. "CC" refers to the constant current, and "CV" refers to the constant voltage.

Hereinafter, the measurement of the initial capacity will be described. The battery was charged to 4.1 V at a current value of 1 C, and the charging operation was stopped for 5 minutes. Next, the battery was discharged to 3.0 V at a current value of 1 C. Next, CC-CV charging (CC current value: 1 C, CV voltage: 4.1 V, end current: 0.1 C) and CC-CV discharging (CC current value: 1 C, CV voltage: 3.0 V, end current: 0.1 C) were performed, and then the discharge capacity was measured.

The stage of charge (SOC) of the battery was adjusted to 60% at 25° C. The battery was discharged at 25° C. for 10 seconds at a current value of 10 C, and then the voltage drop amount was measured. The IV resistance was calculated based on the current value and the voltage drop amount. This measurement was performed on 10 batteries for each of the samples. Table 1 shows the average value of the measured values.

Hereinafter, a cycle durability test will be described. In a thermostatic chamber set to 50° C., 1000 CC charging-discharging cycles (current value: 2 C, voltage range: 3.0 V to 4.1 V) were performed. After 1000 cycles, the capacity after cycles was measured using the same method as in the measurement of the initial capacity. The capacity retention after cycles was calculated by dividing the capacity after cycles by the initial capacity. This measurement was performed on 5 batteries for each of the samples. Table 1 shows the average value of the measured values.

Hereinafter, a storage durability test will be described. The SOC of the battery was adjusted to 100% at 25° C. The battery was put into a thermostatic chamber set to 60° C. and was stored for 100 days. After 100 days, the capacity after storage was measured using the same method as in the measurement of the initial capacity. The capacity retention after high-temperature storage was calculated by dividing the capacity after storage by the initial capacity. This measurement was performed on 50 batteries for each of the samples. Table 1 shows the average value of the measured values.

Hereinafter, measurement of resistance at a low temperature after high-rate cycles will be described. The battery was charged such that the battery voltage reached 3.7 V. At 25° C., 1000 charging-discharging cycles in which charging discharging charging was set as one cycle were performed under the following conditions.

Charging conditions: 80 A×30 seconds
Stop conditions: 30 seconds
Discharging conditions: 8 A×300 seconds After the battery underwent 1000 cycles, the battery voltage was adjusted to 3.7 V. The battery was arranged in a thermostatic chamber set to 0° C. and was charged at a current value of 5 A for 10 seconds. The resistance value was obtained based on polarization during charging. This resistance value was set as a low-temperature resistance after high-rate cycles. The measurement results are shown in Table 1. The lower the low-temperature resistance after high-rate cycles, the higher the low-temperature charging characteristics after high-rate cycles.

Hereinafter, the experiment results of Samples No. 1 to 20 and the investigation thereof will be described. As shown in Table 1, in Samples No. 1 to 14 and 16 to 20 in which the negative electrode mixture layer was formed of the granulated body, cycle durability and storage durability were improved as compared to Sample No. 15 in which the negative electrode mixture layer was formed of the slurry. It is considered that, in Sample No. 15, the first film and the second film were not able to exhibit the functions thereof because the first film and the second film were mutually dissolved during the preparation of the slurry.

In Samples No. 16 to 18, the low-temperature resistance after high-rate cycles was high. It is considered that, in these samples, a side reaction between the electrolytic solution and the negative electrode active material was likely to occur during high-rate cycles because the first film formed of CMC was not formed.

In this experiment, when the thickness of the first film was not less than 0.05 μm and not more than 0.30 superior cycle durability and superior storage durability were exhibited.

When Samples No. 9, 10, and 11 were compared to Samples 1 to 8, it was found that, as the thickness of the first film increased from 0.05 cycle durability and storage durability were improved. It is considered that, by increasing the thickness of the first film, the effect of suppressing a side reaction between the negative electrode active material and the electrolytic solution increased. Accordingly, the thickness of the first film is preferably 0.05 μm or more and more preferably 0.07 μm or more.

When Samples No. 12, 13, and 14 were compared to Samples 1 to 8, it was found that, as the thickness of the first film decreased from 0.30 μm, battery resistance decreased. In addition, by battery resistance being decreased, cycle durability was improved. Accordingly, the thickness of the first film is preferably 0.30 μm or less and more preferably 0.15 μm or less.

In this experiment, when the thickness of the second film was not less than 0.20 μm and not more than 1.00 μm, superior cycle durability and superior storage durability were exhibited. In particular, it can be seen that, when the thickness of the second film was 0.40 μm or more, or 0.80 μm or less, cycle durability was improved.

For example, when Samples No. 9 to 11, 19, and 20 were compared to each other, it was found that cycle durability was improved when the thickness of the second film was 0.40 μm or more. In addition, when the thickness of the second film was 0.80 μm or less, storage durability was improved, and low-temperature resistance after high-rate cycles was also reduced.

Hereinabove, the embodiment and the examples of the invention has been described. It is expected from the beginning that the configurations of the embodiment and the examples can be appropriately combined.

The embodiment and Examples disclosed herein are merely exemplary in all respects and do not limit the invention.

What is claimed is:

1. A nonaqueous electrolyte secondary battery comprising:
    a negative electrode current collector foil; and
    a negative electrode mixture layer that is arranged on the negative electrode current collector foil, wherein
    the negative electrode mixture layer contains a plurality of granulated particles,
    each of the granulated particles contains a negative electrode active material and a coating film,
    the coating film is formed on a surface of the negative electrode active material,
    the coating film includes a first film and a second film, the first film being formed on the surface of the negative electrode active material, and the second film being formed on the first film,
    the first film contains a carboxymethyl cellulose polymer, and
    the second film contains a polyacrylic acid polymer.

2. The nonaqueous electrolyte secondary battery according to claim 1, wherein
    when measured using X-ray photoelectron spectroscopy, a thickness of the first film is not less than 0.05 μm and not more than 0.15 μm.

3. The nonaqueous electrolyte secondary battery according to claim 1, wherein
    when measured using X-ray photoelectron spectroscopy, a thickness of the second film is not less than 0.40 μm and not more than 1.00 μm.

4. The nonaqueous electrolyte secondary battery according to claim 3, wherein
    when measured using X-ray photoelectron spectroscopy, the thickness of the second film is not less than 0.40 μm and not more than 0.80 μm.

5. A method of manufacturing a nonaqueous electrolyte secondary battery, the method comprising:
    forming first films on respective surfaces of negative electrode active materials, the first films containing a carboxymethyl cellulose polymer;
    forming second films on the respective first films, the second films containing a polyacrylic acid polymer;
    obtaining a granulated body containing a plurality of granulated particles by granulating the negative electrode active materials including the first films and the second films;
    obtaining a negative electrode mixture layer by forming the granulated body into a sheet shape; and
    arranging the negative electrode mixture layer on a negative electrode current collector foil.

6. The method of manufacturing a nonaqueous electrolyte secondary battery according to claim 5, wherein the granulated body has a solid content of not less than 65 mass % and not more than 85 mass %.

7. The method of manufacturing a nonaqueous electrolyte secondary battery according to claim 5, wherein
    a mixing amount of the carboxymethyl cellulose polymer is not less than 0.50 parts by mass and not more than 1.07 parts by mass with respect to 100 parts by mass of the negative electrode active materials.

8. The method of manufacturing a nonaqueous electrolyte secondary battery according to claim 5, wherein
    a mixing amount of the carboxymethyl cellulose polymer is not less than 0.36 parts by mass and not more than 1.07 parts by mass with respect to 100 parts by mass of the negative electrode active materials, and
    a mixing amount of the polyacrylic acid polymer is not less than 0.50 parts by mass and not more than 1.00 part by mass with respect to 100 parts by mass of the negative electrode active materials.

* * * * *